United States Patent
Fornal et al.

(10) Patent No.: US 9,444,964 B1
(45) Date of Patent: Sep. 13, 2016

(54) METHOD AND APPARATUS FOR SCANNING AN IMAGE

(71) Applicants: Marvell International Ltd., Hamilton (BM); Lexmark International, Inc., Lexington, KY (US)

(72) Inventors: Bennett Fornal, Boise, ID (US); Douglas Gene Keithley, Boise, ID (US); Zachary Nathan Fister, Lexington, KY (US); Keith Bryan Hardin, Lexington, KY (US); Karl Mark Thompson, Midway, KY (US); Mark Lane Mayberry, Wilmore, KY (US); Joseph K. Yackzan, Lexington, KY (US); Christopher Wilson Case, Georgetown, KY (US)

(73) Assignees: Marvell International Ltd., Hamilton (BM); Lexmark International, Inc., Lexington, KY (US)

( * ) Notice: Subject to any disclaimer, the term of this patent is extended or adjusted under 35 U.S.C. 154(b) by 0 days.

(21) Appl. No.: 14/659,320

(22) Filed: Mar. 16, 2015

Related U.S. Application Data

(60) Provisional application No. 61/954,480, filed on Mar. 17, 2014.

(51) Int. Cl.
| | |
|---|---|
| *H04N 1/04* | (2006.01) |
| *H04N 1/40* | (2006.01) |
| *H04N 1/00* | (2006.01) |
| *H04N 1/36* | (2006.01) |

(52) U.S. Cl.
CPC .......... *H04N 1/00994* (2013.01); *H04N 1/04* (2013.01); *H04N 1/36* (2013.01)

(58) Field of Classification Search
CPC ....... H04N 1/00994; H04N 1/04; H04N 1/36
USPC ....... 358/474, 445, 482, 483, 497, 443, 406, 358/505, 504; 250/234–236, 208.1
See application file for complete search history.

(56) References Cited

U.S. PATENT DOCUMENTS

| | | | |
|---|---|---|---|
| 4,757,389 A | 7/1988 | Clark et al. | |
| 5,193,013 A | 3/1993 | Swanberg | |
| 6,665,019 B1 | 12/2003 | Pronkine | |
| 2001/0032323 A1* | 10/2001 | Takagi | H04N 1/053 713/500 |
| 2004/0013321 A1 | 1/2004 | Ohkawa | |
| 2006/0238225 A1 | 10/2006 | Keithley et al. | |

(Continued)

FOREIGN PATENT DOCUMENTS

| | | |
|---|---|---|
| CN | 1386377 | 12/2002 |
| CN | 1972365 | 5/2007 |

(Continued)

OTHER PUBLICATIONS

The PCT Search Report mailed Jan. 20, 2012 for PCT application No. PCT/US11/56561, 9 pages.

*Primary Examiner* — Cheukfan Lee

(57) ABSTRACT

A method for reducing electromagnetic emissions by an image scanner comprises cyclically dithering a frequency of a clock signal of the image scanner by repeated dither cycles, determining a phase of the dither cycle when a scan pass of a page of a document commences; and commencing all subsequent scan passes of the page of the document at a particular phase shift from the determined phase of the dither cycle.

21 Claims, 6 Drawing Sheets

(56) References Cited

U.S. PATENT DOCUMENTS

| | | |
|---|---|---|
| 2007/0120989 A1 | 5/2007 | Minami et al. |
| 2008/0106748 A1* | 5/2008 | Tsukahara .......... H04N 1/40056 358/1.1 |
| 2009/0086045 A1 | 4/2009 | Giebel et al. |
| 2009/0140896 A1* | 6/2009 | Adduci ................ H03L 7/0805 341/131 |
| 2009/0213261 A1 | 8/2009 | Nagase et al. |
| 2010/0193588 A1 | 8/2010 | Cherry |
| 2012/0099159 A1* | 4/2012 | Keithley ............ H04N 1/00994 358/406 |

FOREIGN PATENT DOCUMENTS

| | | |
|---|---|---|
| CN | 101567641 | 10/2009 |
| EP | 2088766 | 8/2009 |
| EP | 2150041 | 2/2010 |
| JP | 2000022959 | 1/2000 |
| JP | 20010077989 | 3/2001 |
| JP | 2001268355 | 9/2001 |
| JP | 2002281252 | 9/2002 |
| JP | 2003008845 | 1/2003 |
| JP | 2009141523 | 6/2009 |

* cited by examiner

METHOD AND APPARATUS FOR SCANNING AN IMAGE

CROSS REFERENCE TO RELATED APPLICATIONS

The present disclosure claims the benefit of and priority to U.S. Provisional Patent Application No. 61/954,480, filed on Mar. 17, 2014, which is incorporated herein by reference.

TECHNICAL FIELD

This disclosure relates to image scanning devices, and more particularly to techniques for reducing electromagnetic interference generated by image scanning devices.

BACKGROUND

Optical image scanners typically transfer scanned image data from scanning hardware to some type of device controller. Because of design and packaging constraints, the device controller may be located at a significant distance from the scanning hardware. This creates the potential to generate unacceptable amounts of electromechanical interference (EMI, also referred to as radio-frequency interference or RFI).

Various techniques can be used to limit or mitigate EMI emissions, including bypassing, decoupling, shielding, and clock dithering. When using clock dithering, which may also be referred to as PLL dithering, a communications clock and corresponding data transfer rate are modulated by a small amount, such as 0.5-5% of the nominal data transfer rate, with 3% being typical. This spreads emitted EMI through a range of frequencies, and results in a reduction or mitigation of measured EMI.

Clock dithering can typically be implemented without significant hardware costs such as might be involved with electrical and mechanical techniques. However, clock dithering can reduce the accuracy and resolution of image scanning. This is particularly true as designers attempt to achieve ever higher levels of scanner speed and performance.

SUMMARY

In various embodiments, the present disclosure provides a method of reducing electromagnetic emissions generated by an image scanner. For example, the method may comprise cyclically dithering a frequency of a clock signal of the image scanner by repeated dither cycles. Upon commencement of a scan pass of a page of a document, the method may include determining a phase of the dither cycle and commencing all subsequent scan passes of the page of the document at a particular phase shift from the determined phase of the dither cycle.

In some embodiments, an optical scanner comprises a clock to provide a clock signal and scan control logic to: cyclically dither the frequency of the clock signal by repeating dither cycles. Upon commencement of a scan pass of a page of a document, the scan control logic determines a phase of the dither cycle and commences all subsequent scan passes of the page of the document at a particular phase shift from the determined phase of the dither cycle.

In some embodiments, an apparatus comprises a clock generator that generates a clock signal; a scanning unit that is responsive to the clock signal to scan a document in repeated pixel scan passes; and scan control logic configured to: cyclically dither the frequency of the clock signal by repeating dither cycles. Upon commencement of a scan pass of a page of a document, the scan control logic determines a phase of the dither cycle and commence all subsequent scan passes of the page of the document at a particular phase shift from the determined phase of the dither cycle.

BRIEF DESCRIPTION OF THE DRAWINGS

Embodiments of the present disclosure will be readily understood by the following detailed description in conjunction with the accompanying drawings. To facilitate this description, like reference numerals designate like structural elements. Embodiments of the disclosure are illustrated by way of example and not by way of limitation in the figures of the accompanying drawings.

DETAILED DESCRIPTION

Image scanners typically use a scanning mechanism in which a sensor or sensor array is sequentially moved or passed over adjacent lines of a source image. As the sensor moves across the source image, the sensor transmits a serial sequence of scanned color and/or brightness values. The values are sampled and transmitted at a relatively high frequency. However, at higher resolutions, sensors may be sensitive to variable scanning frequencies. For example, some sensors may have outputs that decay or settle with time, and some designs may sample such outputs before the outputs have completely settled. For at least these reasons, even small variations of scanning and data transfer rates may produce undesirable effects such as inconsistencies, anomalies, and artifacts in scanned image data. Accordingly, it may be beneficial to sample the outputs of image sensors at consistent rates to avoid such effects.

On the other hand, an image scanner may use clock dithering, which is an intentional variation of scanning and data transfer rates, to reduce EMI emissions.

Embodiments described herein include methods and apparatuses for implementing clock dithering while avoiding the undesirable effects caused by variations of scanning and data transfer rates, as described above. In some particular embodiments, all scan passes of a page of a document being scanned are started at the same phase of a dither cycle. For example, all scan passes may be started at zero offset of a dither cycle. By starting all scan passes at the same phase of the dither cycle, scan results for all the scan passes will experience identical dither configurations, thus avoiding variations of scanning and data transfer rates among the multiple scan passes of a page of a document. In other words, each scanning pass commences at the same point within a dithering cycle, and each scanning pass is thus performed under a consistent and repeatable clock frequency pattern. Such configurations may comprise several full dither cycles plus a partial dither cycle, for example.

Although example embodiments involve scanning processes, techniques described herein may be implemented involving laser scanning by a printer. For example, issues and/or artifacts described for scanning by a scanner may be the same as or similar to those for scanning by a printer. Differences between scanning by a scanner and scanning by a printer may include direction of data and/or control.

Figure 1:
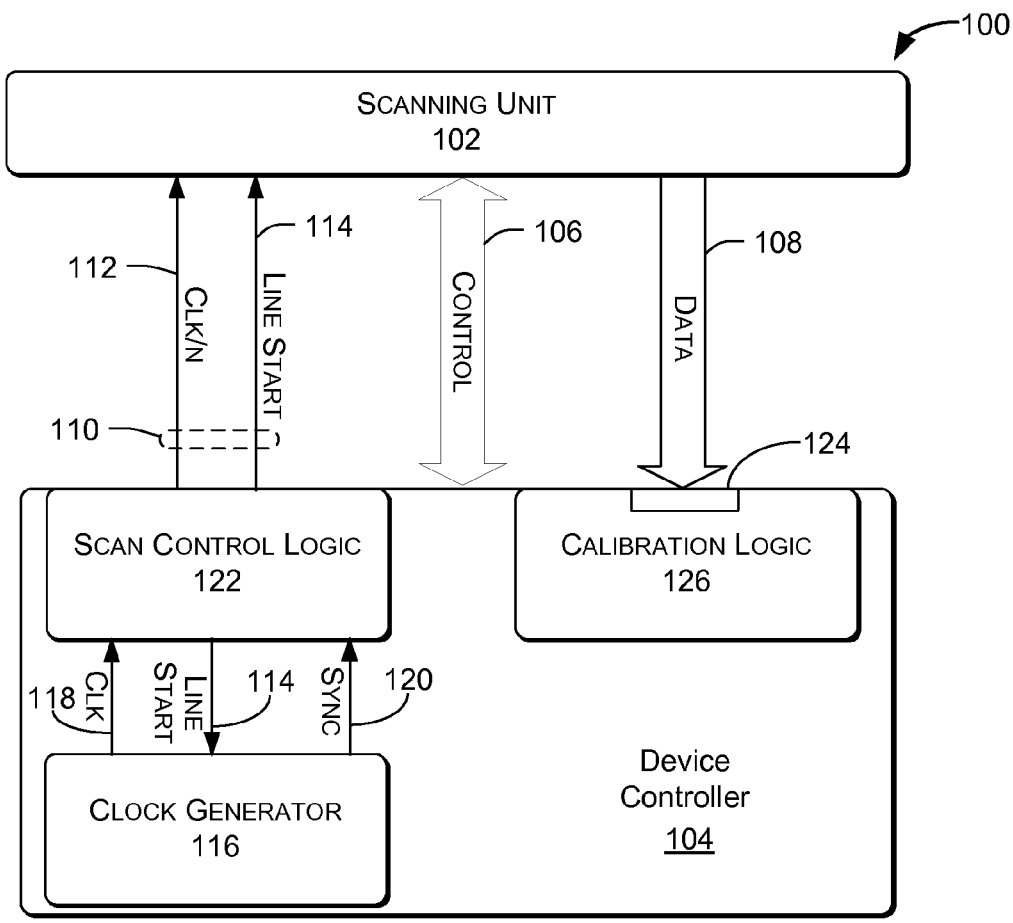
FIG. 1 is a block diagram illustrating an image scanning device, according to some embodiments.

FIG. 1 is a block diagram illustrating an image scanning device 100, according to some embodiments. Image scanning device 100 may be integrated with a printer mechanism and/or other components to form what has become commonly known as a multi-function printer or MFP (not illustrated). In other embodiments, image scanning device 100 may comprise a stand-alone scanner. Furthermore, certain embodiments may comprise components or subcomponents of image scanning device 100.

Image scanning device 100 may include a scanning unit 102 that performs image scanning functions. Scanning unit 102 has one or more optical sensors, sensor assemblies, or other scanning elements (not illustrated), which may comprise charge-coupled devices (CCDs) or other types of optical sensing devices.

A source medium (not illustrated), such as a sheet of paper, may contain a source image. The source medium may be positioned above, below, or otherwise adjacent to the scanning elements. The scanning elements may be configured to perform sequential scanning or sense passes over the source image. For example, scanning unit 102 may have a transport mechanism (not illustrated) configured to move or pass the scanning elements across a horizontal line of the source medium so that the scanning elements or sensors can sample individual locations or pixels along the line. In addition, either the source medium or the transport mechanism of scanning unit 102 may be moved so that each pass of the scanning elements is of a different line of the source image.

Thus, scanning unit 102 may perform scanning passes of sequential image lines, each line of which comprises multiple pixels. Within each line, data may be output from scanning unit 102 as a series or sequence of pixel values. The sequence of pixel values may correspond to physical movement of the scanning elements across the source medium, or may correspond to serial output characteristics of the scanning elements.

Image scanning device 100 includes a device controller 104 that is configured to control the operation of scanning unit 102 and any other integrated functionality such as a printer component (not illustrated). Device controller 104 may also be configured to receive scanning data from scanning unit 102 and its scanning elements. Device controller 104 may also perform other functions, such as communicating with external devices and interacting with users.

Because of design and packaging constraints, and the integration of multiple components within a single device, device controller 104 may be at some distance from scanning unit 102. For example, device controller 104 may be positioned at the bottom of image scanner 100, and a communications bus or cable (not illustrated) may extend within image scanner 100 between device controller 104 and the scanning unit 102. Such a cable may carry or convey multiple signals, including data and control signals. These signals may include scanned data signals, clock signals, synchronization signals, and so forth. For example, the cable may convey scanned pixel data from the scanning elements to device controller 104, in synchronization with a clock signal. In accordance with the techniques described herein, the clock signal may be dithered to mitigate electromagnetic emission issues.

Communications between device controller 104 and scanning unit 102 take place through a communications bus or cable, which may include a control bus 106 and a data bus 108. The communications cable may also include various timing and synchronization signals 110. The timing and synchronization signals 110 may include a derivative clock signal 112 and a line start signal 114, which will be referred to herein as the CLK/n signal and the LINE START signal, respectively. In some implementations, the CLK/n and LINE START signals may be considered part of the control bus, although the CLK/n and LINE START signals are shown separately for purposes of explanation.

Scanning unit 102 may receive the CLK/n signal and the LINE START signal. Scanning unit 102 is responsive to the CLK/n and LINE START signals, as well as to other commands that may be presented through the control bus, to initiate individual sensing or scanning passes.

Device controller 104 includes a clock generator module 116 that generates additional synchronization signals, including a CLK signal 118 and a SYNC signal 120. Device controller 104 may also include a scan control logic module 122 that receives the CLK and SYNC signals and that generates the CLK/n and LINE START signals based on the CLK and SYNC signals.

Device controller 104 includes a pixel data receive port 124 configured to receive serial pixel data transmitted by scanning unit 102 over data bus 108. The serial pixel data may be in analog or digital format. An analog-to-digital converter (not illustrated) may be used within device controller 104 or scanning unit 102 to convert analog pixel data to digital pixel data.

Device controller 104 may also include calibration logic module 126 that is configured to correct pixel data received from scanning unit 102. Calibration logic module 222 may have access to correction data that is applied to received pixel values. The correction data may be obtained during a previous calibration procedure, in which a known calibration image is scanned and evaluated. The calibration image may have lines or areas of constant color and/or brightness, so that the consistency of scanning unit 102 may be evaluated at different physical locations relative to the source media. Sensed inconsistencies in different physical locations are noted, and correction values may be calculated corresponding to different pixel locations. During subsequent scanning of source media, the correction values may be applied to received pixel values based on the locations to which the pixel values correspond.

Inconsistencies in pixel data may result from a variety of factors, such as variations in illumination, sensor positioning, and so forth. Calibration logic module 126 may assume that such inconsistencies are functions of position, and that such positional inconsistencies will remain relatively constant over time. Thus, the correction data may include correction values for each pixel position of a line, and each received line may be subject to the same correctional data. Alternatively, the correction data may have values corresponding to the respective pixel positions of an entire scanned sheet or two-dimensional scanned area.

In some embodiments, clock generator module 116 may receive a line start signal from scan control logic module 122 to start a dithering sequence. Sync signal 120 need not be present. For example, phase determination may be performed by clock generator module 116. In particular, clock generator module 116 may modify how it behaves based, at least in part, on receiving a line start signal from scan control logic module 122. Clock generator module 116 may also modify how it behaves based, at least in part, on when clock generator module 116 receives a line start signal (relative to the dithering cycle).

Figure 2:
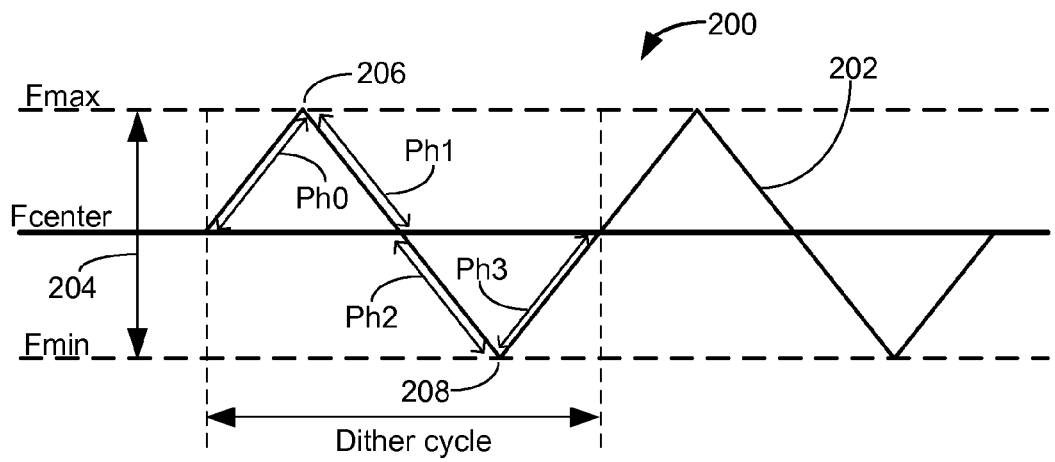
FIG. 2 is a plot of the dithered frequency of a clock signal as a function of time, according to some embodiments.

FIG. 2 is a plot 200 of the dithered frequency of a dithered clock signal 202 as a function of time, according to some embodiments. For example, such a clock signal may be generated by a clock generator such as 116, illustrated in FIG. 1. Moreover, in such an implementation, scan control logic module 122 may modulate the clock signal to generate dithered clock signal 202.

Clock signal 202 may be an oscillating signal having a nominal frequency that is dithered by some predefined amount such as by ±0.5-5% of the nominal frequency, with 3% being a typical dithering amount. The dither frequency is typically 30-100 KHz, but is not limited to this range. Generally, the dither period is less than or equal to the time required for a single scan pass. Typically, the dither period is shorter than the scan pass, and multiple dithering cycles may occur during every scan pass.

Dithered clock signal 202 may have an upper frequency Fmax, a lower frequency Fmin, and a central frequency Fcenter. The frequency difference 204 between Fmax and Fmin may be about 10% of the nominal frequency, as mentioned above. The frequency offset at a particular phase of dithered clock signal 202 is considered to be the difference between the frequency at the particular phase and Fcenter. Thus, for example, the largest frequency offset at phase 206 is Fmax and the frequency offset at phase 208 is Fmin.

In some implementations, Fcenter need not be halfway between Fmin and Fmax (e.g., half of peak-to-peak range 204). In the particular example embodiment illustrated in FIG. 2, dithered clock signal 202 varies as a triangle wave, but in other embodiments dithered clock signal 202 may vary as a sinusoidal wave, a sawtooth wave, or as any other time-varying function, for example.

A dither cycle may be identified as a complete cycle of dithered clock signal 202. For example, if the commencing of a dither cycle occurs at a particular phase of dithered clock signal 202, then the end of the dither cycle occurs at the next occurrence of the particular phase. In the particular example embodiment illustrated in FIG. 2, the dither cycle commences and ends at the phase of dithered clock signal 202 corresponding to the frequency Fcenter with positive slope.

Several portions of dithered clock signal 202 are identified for the sake of describing some embodiments below. Ph0 is considered to be the first quarter of the dither cycle, Ph1 is considered to be the second quarter of the dither cycle, Ph2 is considered to be the third quarter of the dither cycle, and Ph3 is considered to be the fourth quarter of the dither cycle.

Figure 3:
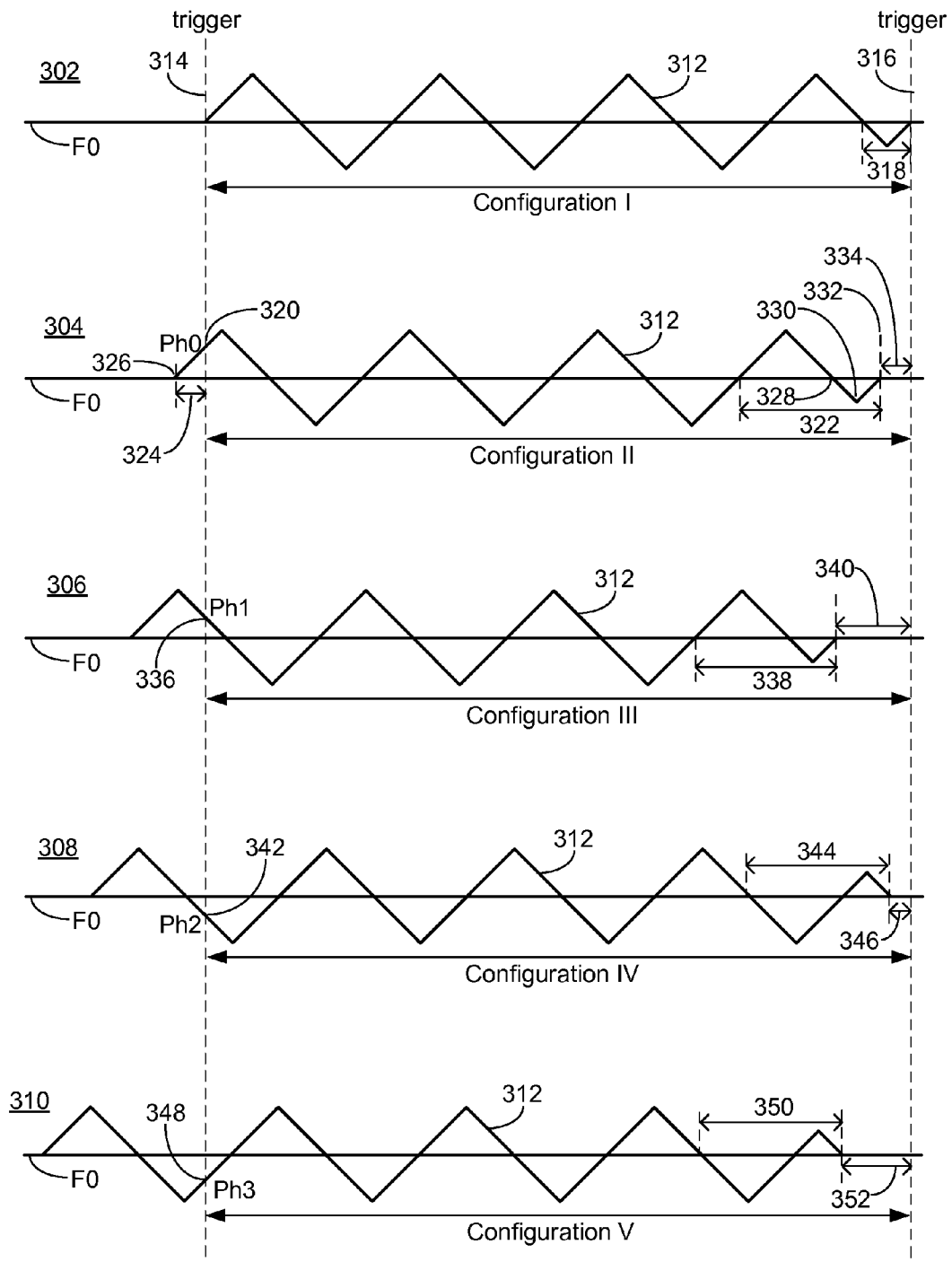
FIG. 3 includes plots of the dithered frequency of a clock signal as a function of time for various dither phases, according to some embodiments.

FIG. 3 includes plots 302-310 of the dithered frequency of a clock signal 312 as a function of time for various dither phases at the time a trigger 314 is received or detected, according to some embodiments. In the plots, the central frequency (e.g., zero offset or Fcenter in FIG. 2) is F0, and the frequency of clock signal 202 is dithered as a triangle wave, but many types of frequency variations are possible. Trigger 314 may occur when a scan pass of one or more lines of a document commences. A subsequent trigger 316 may occur when a scan pass of the one or more lines of the document ends. Trigger 316 of a scan pass may be the same as the trigger for the next scan pass. Several complete dither cycles plus a partial dither cycle may occur during a scan pass.

Generally, trigger 314 and trigger 316 of a scan pass may occur at any phase or portion of clock signal 312. Examples of such cases are illustrated in plots 302-310. For example, in plot 302, trigger 314 occurs at a phase of clock signal 312 that corresponds to central frequency F0. In plot 304, trigger 314 occurs in the first quarter Ph0 of clock signal 312. In plot 306, trigger 314 occurs in the second quarter Ph1 of clock signal 312. In plot 308, trigger 314 occurs in the third quarter Ph2 of clock signal 312. In plot 310, trigger 314 occurs in the fourth quarter Ph3 of clock signal 312.

In some embodiments, dither configuration I corresponds to a "target" situation, where the duration of a single scan pass commences and ends at the same phase of clock signal 312. For example, trigger 314 and trigger 316 of the scan pass for configuration I both occur at zero frequency offset and the same phase of clock signal 312. Also, in this case, the scan pass includes complete dither cycles and a partial dither cycle 318 that ends at end trigger 316. Generally, however, the initial scan pass (e.g., a trigger of the scan pass) may commence at any phase of clock signal 312. Such cases are shown in plots 304-310. Thus, in some embodiments, techniques are performed so that the duration of each scan pass of a page of a document commences and ends at the same phase of clock signal 312. Such techniques may include, for example, modifying the shape of the partial dither cycle based, at least in part, on the phase of the clock signal at which the trigger of the first scan pass of a page occurs. Subsequent scan passes of the page use the modified shape of the partial dither cycle. Plots 304-310 are examples of trigger 314 occurring at various phases of clock signal 312, as described below.

In plot 304, trigger 314 occurs at a phase 320 in the first quarter Ph0 of clock signal 312. This situation may correspond to a configuration II, which includes one or more complete dither cycles and a partial dither cycle 322. Any of a number of techniques may be used to develop a dither configuration so that the duration of each scan pass of commences and ends at the same phase of clock signal 312. For example, in some implementations, a partial dither cycle a dither configuration may be modified as follows. A processor (e.g., scan control logic module 122) may detect or determine a phase difference 324 between the commencing 326 of a first scan pass of a document and phase 320, which is the point of clock signal 312 where trigger 314 occurs. Partial dither cycle 322 may comprise a portion of a complete dither cycle corresponding to phase difference 324 plus a return-to-F0 portion. In other words, the portion of a complete dither cycle corresponding to phase difference 324 is the portion of clock signal 312 between 328 and 330 and the return-to-F0 portion is the portion of clock signal 312 between 330 and 332. Additionally, partial dither cycle 322 may also include a half dither cycle, which is the portion of partial dither cycle 322 above F0. The half dither cycle may be included so that partial dither cycle 322 ends at a particular desired phase which, in the example embodiments of FIG. 3, corresponds to F0. During a duration 334 between 332 and end trigger 316, clock dithering is suspended so that the frequency of clock signal 312 is not varied. During duration 334, noise reduction benefits from dithering may be suppressed, but duration 334 is relatively short and any adverse effect caused by such suppression may be relatively small or negligible. In some implementations, the return-to-F0 portion may be a linear transition of dither frequency, but any of a number of transition shapes may be used.

Accordingly, configuration II of clock signal 312 ends at a particular phase (corresponding to zero-offset in the example embodiment of FIG. 3). All subsequent scan passes for a page of a document will commence at that particular phase. Thus, scan results for all the subsequent scan passes will experience identical dither configurations, thus avoiding variations of scanning and data transfer rates among the multiple scan passes of a page of a document. In some implementations, the process described above is performed for a first scan pass of a page of a document. Such a first scan pass may be repeated so that scan results of the first scan pass are replaced by scan results of the repeat scan pass.

The process described above for configuration II may be different for configurations III, IV, and V. For example, any of a number of techniques may be used to render configuration I, which comprises a dithered clock signal 312 that commences at the same phase for all scan passes of a page of a document.

In plot 306, trigger 314 occurs at a phase 336 in the second quarter Ph1 of clock signal 312. This situation may correspond to configuration III, which includes one or more complete dither cycles and a partial dither cycle 338. In some implementations, a partial dither cycle may be modified as follows. A processor (e.g., scan control logic module 122) may detect or determine a phase difference between the commencing of a first scan pass of a document and phase 336, which is the point of clock signal 312 where trigger 314 occurs. Partial dither cycle 338 may comprise a portion of a complete dither cycle plus a return-to-F0 portion. During a duration 340 clock dithering is suspended so that the frequency of clock signal 312 is not varied. During duration 340, noise reduction benefits from dithering may be suppressed, but duration 340 is relatively short (though longer than 334 of configuration II) and any adverse effect caused by such suppression may be relatively small or negligible. In some implementations, the return-to-F0 portion may be a linear transition of dither frequency, but any of a number of transition shapes may be used.

Accordingly, configuration III of clock signal 312 ends at a particular phase (corresponding to zero-offset in the example embodiment of FIG. 3). All subsequent scan passes for a page of a document will commence at that particular phase. In other words, all subsequent scan passes may be performed accordingly to configuration I. Thus, scan results for all the subsequent scan passes will experience identical dither signatures, even though the commencing of the first scan pass occurred at an arbitrary phase (e.g., 336).

In plot 308, trigger 314 occurs at a phase 342 in the third quarter Ph2 of clock signal 312. This situation may correspond to configuration IV, which includes one or more complete dither cycles and a partial dither cycle 344. Partial dither cycle 344 may comprise a portion of a complete dither cycle plus a return-to-F0 portion. Partial dither cycle 344 may include a half dither cycle, which is the portion of partial dither cycle 344 below F0. The half dither cycle may be included so that partial dither cycle 344 ends at a particular desired phase which, in the example embodiments of FIG. 3, corresponds to F0. During a duration 346 clock dithering is suspended so that the frequency of clock signal 312 is not varied. During duration 346, noise reduction benefits from dithering may be suppressed, but duration 340 is relatively short and any adverse effect caused by such suppression may be relatively small or negligible. In some implementations, the return-to-F0 portion may be a linear transition of dither frequency, but any of a number of transition shapes may be used.

In plot 310, trigger 314 occurs at a phase 348 in the fourth quarter Ph3 of clock signal 312. This situation may correspond to configuration V, which includes one or more complete dither cycles and a partial dither cycle 350. Partial dither cycle 350 may comprise a portion of a complete dither cycle plus a return-to-F0 portion. During a duration 352 clock dithering is suspended so that the frequency of clock signal 312 is not varied. During duration 352, noise reduction benefits from dithering may be suppressed, but duration 352 is relatively short and any adverse effect caused by such suppression may be relatively small or negligible. In some implementations, the return-to-F0 portion may be a linear transition of dither frequency, but any of a number of transition shapes may be used.

Figure 4:
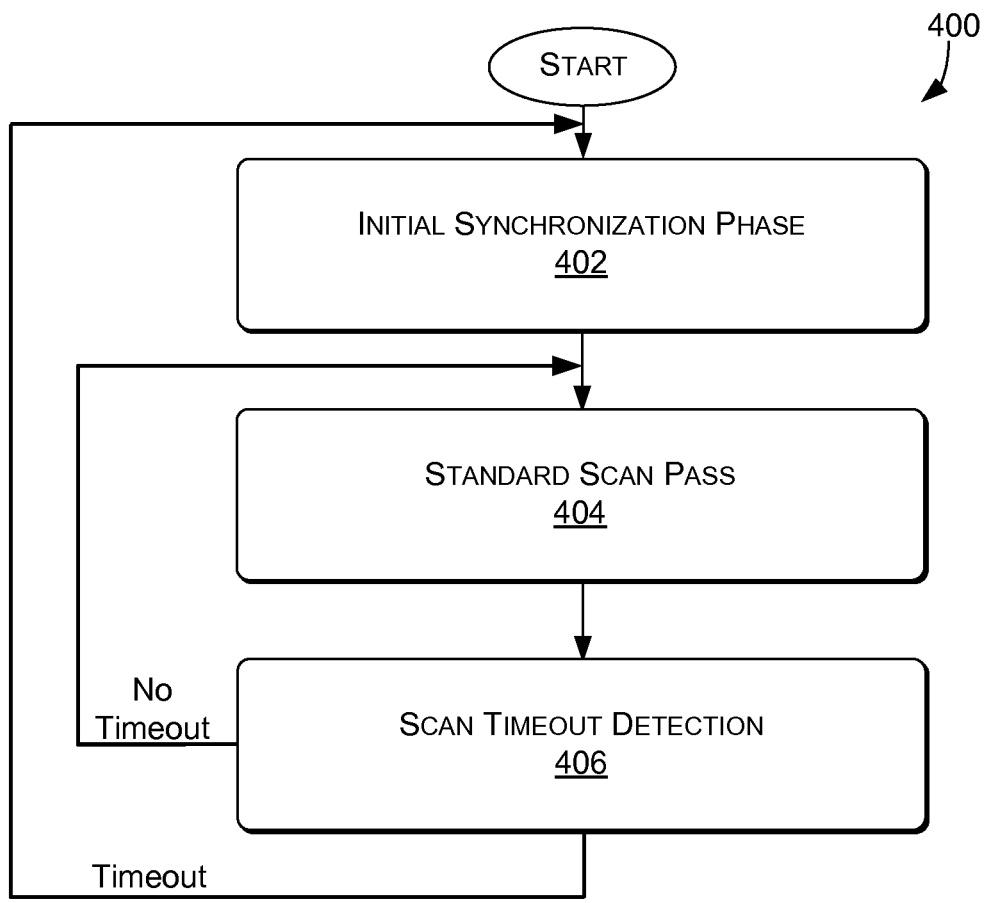
FIGS. 4-8 are flow diagrams of processes of synchronizing scan passes with dither cycles, according to some embodiments.

FIG. 4 is a flow diagram of a process 400 for synchronizing scan passes of a document with dither cycles, according to some embodiments. Such a process may be performed by scan control logic module 122 of image scanning device 100 illustrated in FIG. 1, for example. Each of the blocks 402, 404, and 406 are illustrated in detail in FIGS. 5-7 and further described below. Block 402 includes an initial synchronization phase, which includes the first scan pass of a page of the document. Block 402 leads to development of a particular dither configuration (e.g., configuration I, illustrated in FIG. 3) that will be used for all subsequent scan passes of a particular page of the document. Block 404 includes a standard scan pass, which involves using the particular dither configuration generated in block 402 for all scan passes on the page of the document. Block 406 involves detecting the end of the page of the document. If the end of the page is detected (e.g., a timeout occurs), then process 400 returns to block 402. If the end of the page is not detected (e.g., no timeout occurs), then process 400 returns to block 404. Details of blocks 402-406 are now described with references to FIGS. 5-7.

Figure 5:
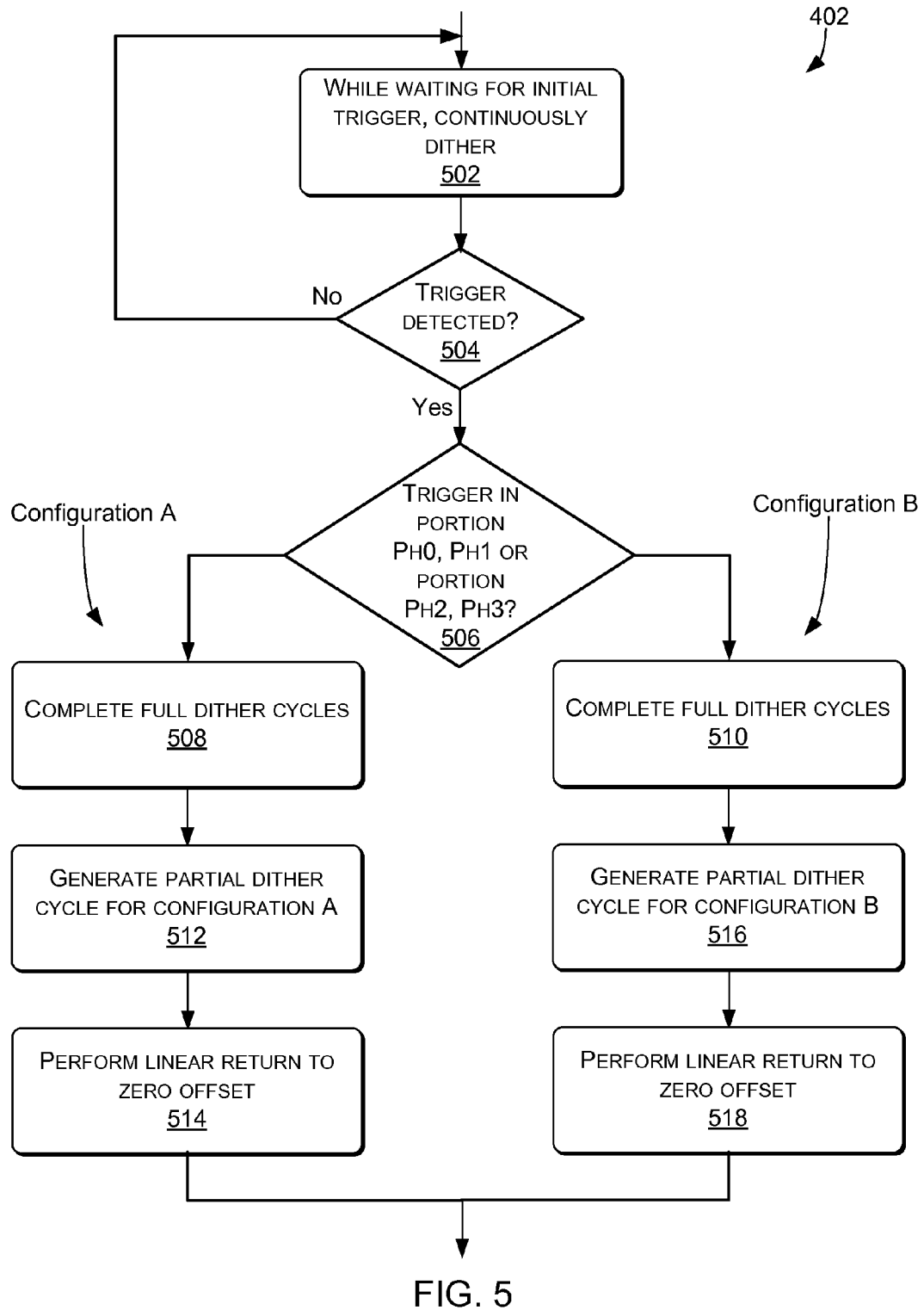

FIG. 5 illustrates details of block 402 in flow diagram 400. Block 402 comprises an initial synchronization phase, which may be the first scan pass of a page of a document. At block 502, control logic module 122 of image scanning device 100 may dither a clock signal generated by clock generator module 116, for example. At diamond 504, control logic module 122 may determine if an initial trigger for a scan pass is detected. If not, then the process of block 402 returns to block 502 and dithering continues. On the other hand, if an initial trigger is detected, then the process proceeds to diamond 506, where control logic module 122 may determine the portion of the clock signal, or the phase of the clock signal, at which the initial trigger occurred. For example, referring to FIG. 2, a dithered clock signal (e.g., such as 202) may include a first quarter portion Ph0, a second quarter portion Ph1, a third quarter portion Ph2, and a fourth quarter portion Ph3. In the particular embodiment described for process 400, if the initial trigger occurs in portion Ph0 or Ph1 of the clock signal, the process proceeds to block 508 and a configuration A will be developed and used for subsequent scan passes. If the initial trigger occurs in portion Ph2 or Ph3 of the clock signal, the process proceeds to block 510 and a configuration B will be developed and used for subsequent scan passes.

For the case where the initial trigger occurs in portion Ph0 or Ph1 of the clock signal, the process proceeds from diamond 506 to block 508. For the first scan pass, the frequency of the clock signal may be varied for several full dither cycles. At the end of the last full dither cycle, and before an end trigger of the scan pass or the initial trigger of the subsequent scan pass, the process proceeds to block 512, where a partial dither cycle is developed for a configuration A. In some example embodiments, configuration A may be the same as or similar to configurations II and III, illustrated in FIG. 3. The partial dither cycle is completed at block 514 where control logic module may linearly vary the frequency of the clock cycle to return to zero offset from the frequency of the non-dithered clock signal (e.g., Fcenter). In some other embodiments, the partial dither cycle may include a linear return to another frequency of the dithered clock signal. Whatever the final frequency of the linear return, this is the frequency at which all subsequent scan passes of a page of a document commence. In other embodiments, the return to zero (or the return to another frequency) need not be linear. For example, a return to zero may follow an exponential decay or sinusoid. Subsequent to completion of block 514, the process proceeds to block 404, illustrated in FIG. 6.

For the case where the initial trigger occurs in portion Ph2 or Ph3 of the clock signal, the process proceeds from diamond 506 to block 510. For the first scan pass, the frequency of the clock signal may be varied for several full dither cycles. At the end of the last full dither cycle, and before an end trigger of the scan pass or the initial trigger of the subsequent scan pass, the process proceeds to block 516, where a partial dither cycle is developed for a configuration B. In some example embodiments, configuration B may be the same as or similar to configurations IV and V, illustrated in FIG. 3. The partial dither cycle is completed at block 518 where control logic module may linearly vary the frequency of the clock cycle to return to zero-offset from the frequency of the non-dithered clock signal (e.g., Fcenter). In some other embodiments, the partial dither cycle may include a linear return to another frequency of the dithered clock signal. Whatever the final frequency of the linear return, this is the frequency at which all subsequent scan passes of a page of a document commence. In other embodiments, the return to zero (or the return to another frequency) need not be linear. For example, a return to zero may follow an exponential decay or sinusoid. Subsequent to completion of block 518, the process proceeds to block 404, illustrated in FIG. 6.

Figure 6:
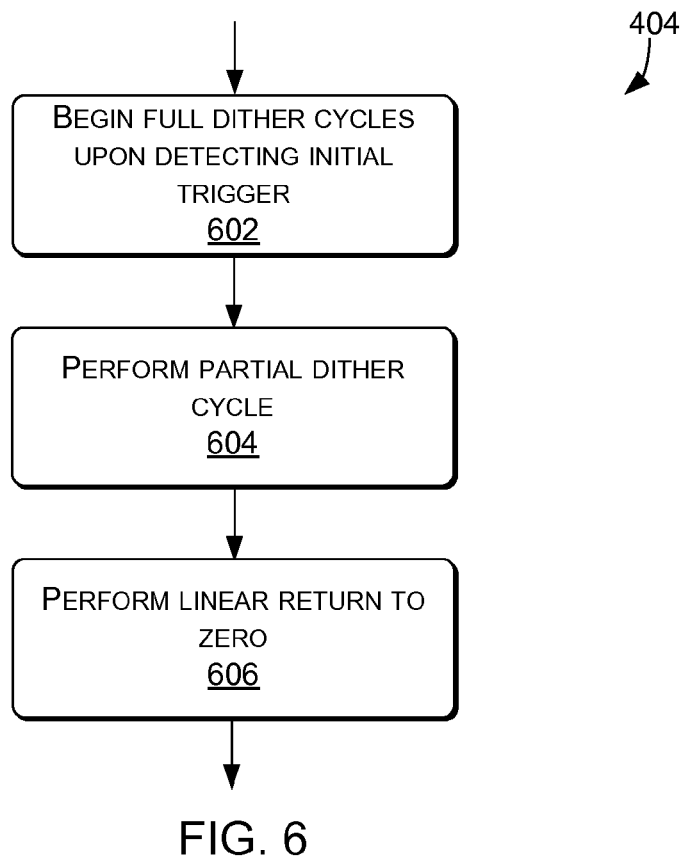
Figure 7:
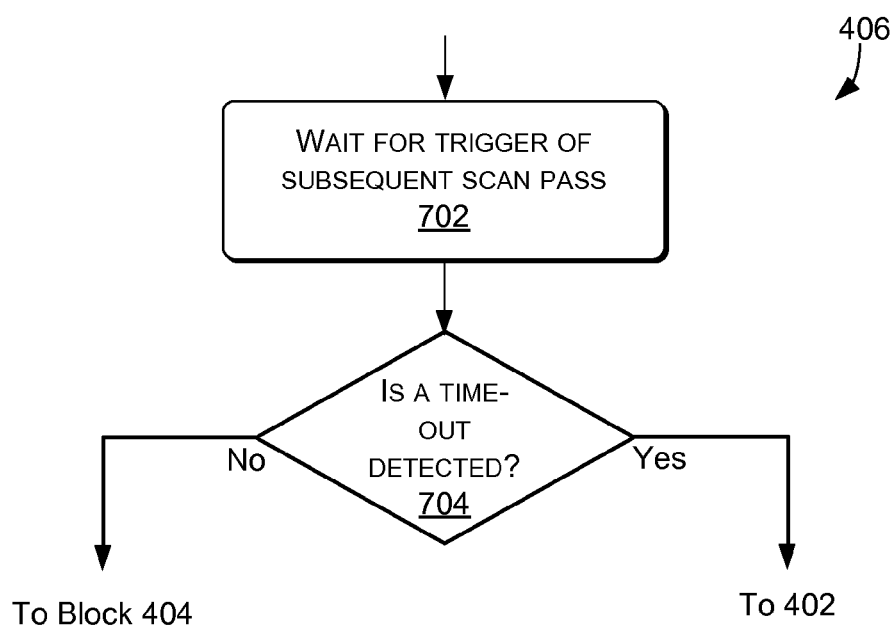

FIG. 6 illustrates details of block 404 in flow diagram 400. During the process of block 404, the first scan pass of a page may be repeated (the initial first scan pass having occurred during the process of block 402) using the clock signal configuration developed in block 402. Moreover, all the subsequent scan passes of the page will use the same clock signal configuration. For example, at block 602, a scan pass commences upon detection of an initial trigger (e.g., 314). At that time, the scan pass is performed during several full dither cycles. Upon completion of the last full dither cycle, and before the next scan pass commences, the process proceeds to block 604, where control logic module 122 may perform a partial dither cycle according to the clock signal configuration developed in block 402. The partial dither cycle is completed at block 606, where the control logic module 122 linearly returns the dither frequency to zero-offset from the frequency of the non-dithered clock signal (e.g., Fcenter). In some other embodiments, the partial dither cycle may include a linear return to another frequency of the dithered clock signal. Whatever the final frequency of the linear return, this is the frequency at which all scan passes of a page of a document commence. In other embodiments, the return to zero (or the return to another frequency) need not be linear. For example, a return to zero may follow an exponential decay or sinusoid. Subsequent to completion of block 606, the process proceeds to block 406, illustrated in FIG. 7.

Block 406 is performed at the conclusion of each scan pass of the document. Block 406 includes a portion of process 400 where a last scan pass of a page may be detected. For example, at block 702, control logic module 122, at the end of the clock signal configuration developed in block 402, waits for a trigger of a subsequent scan pass. Such waiting may occur over a duration when dithering is suppressed and the frequency of the clock signal is held constant (e.g., refer to durations 334, 340, 346, and 352 illustrated in FIG. 3). At diamond 704, control logic module 122 may determine if a timeout signal is detected. Such a time-out signal may be generated by image scanning device 100 to indicate that the end of a page is encountered and the last scan pass is the final scan pass for the page. If a timeout signal is not detected, then process 400 returns to block 404 so that control logic module 122 may perform additional one or more scan passes. If a timeout signal is detected, then process 400 returns to block 402 so that control logic module 122 may generate a new clock signal configuration for a subsequent page.

Figure 8:
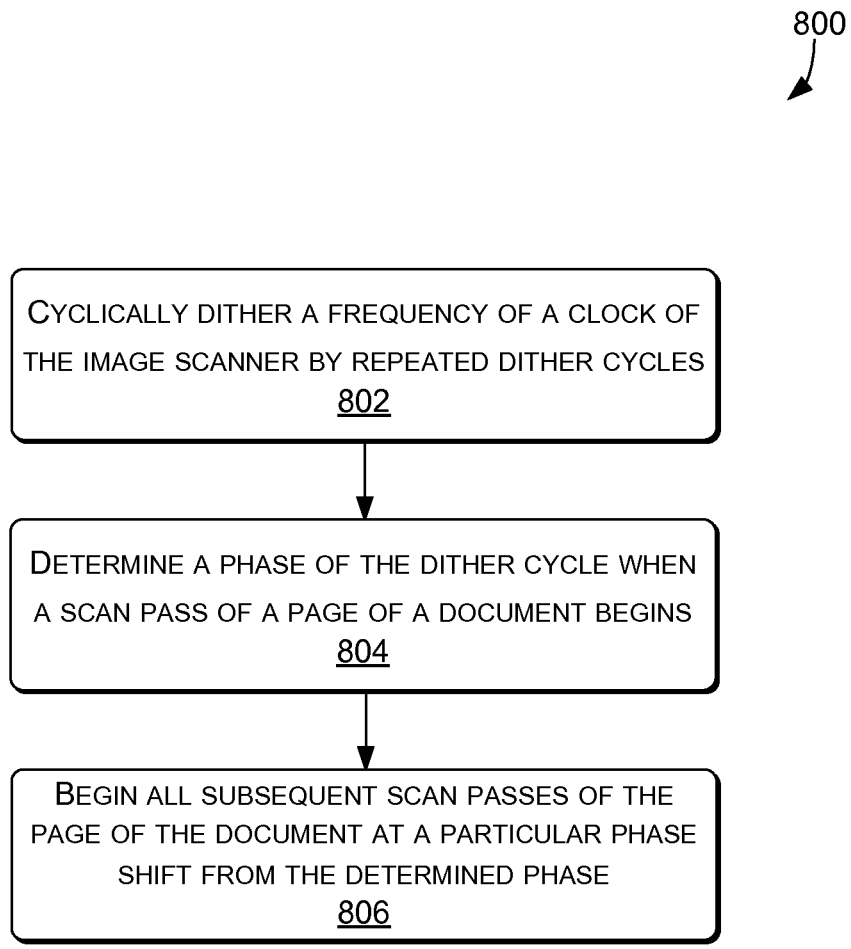

FIG. 8 is a flow diagram of a process 800 for reducing electromagnetic emissions by an image scanner by synchronizing scan passes with dither cycles, according to some embodiments. Process 800 may be performed while scanning a page of a document. Process 800, which may be performed by a processor such as control logic module 122, may be the same as or similar to process 400 described above. At block 802, the processor may cyclically dither a frequency of a clock signal of the image scanner by repeated dither cycles. An example of a dither cycle is illustrated in FIG. 2. As another example, configuration I of FIG. 3 illustrates three full dither cycles. At block 804, the processor may determine a phase of the dither cycle when a scan pass of the page commences. In some implementations, the scan pass commences upon detection of an initial trigger, such as 314 illustrated in FIG. 3. At block 806, the processor may commence all subsequent scan passes of the page at a particular phase shift from the determined phase. For example, all scan passes of the page may commence at a phase of the clock signal corresponding to the non-dithered frequency of the clock signal. For example, if the determined phase is 90 degrees (out of a 360 degree dither cycle) from the zero-offset frequency of the clock signal, then all scan passes may commence at a phase shift of 90 degrees from the determined phase, which is at the zero frequency offset of the dither cycle.

In some embodiments, the processor may commence all subsequent scan passes of the page of the document at the particular phase shift from the determined phase without delaying the subsequent scan passes.

Upon performing the last scan pass of the page, the processor may detect the last scan pass and subsequently determine a phase of the dither cycle when the first scan pass of the next page of the document commences. Following process 800, the processor may then commence all subsequent scan passes of the subsequent page of the document at a particular phase shift from the determined second phase.

The techniques described above allow the use of clock frequency dithering to address EMI issues. Synchronizing scanning passes to repeatable dithering cycles furthermore allows scanning devices to compensate for any inconsistencies in sensor that that might otherwise result from clock dithering.

In accordance with various embodiments, an article of manufacture may be provided that includes a storage medium having instructions stored thereon that, if executed, result in the operations described above. In an embodiment, the storage medium comprises some type of non-transitory memory (not shown). In accordance with various embodiments, the article of manufacture may be a computer-readable medium such as, for example, software or firmware.

Various operations may have been described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments. Additionally, although various embodiments of an interposer are described and illustrated as having various types of connector configurations located of both sides (or surfaces) of an interposer, in some embodiments, only one surface (or side) of an interposer includes a particular connector configuration as described herein while the opposing surface may include a connector configuration according to conventional techniques.

The description incorporates use of the phrases "in an embodiment," or "in various embodiments," which may each refer to one or more of the same or different embodiments. Furthermore, the terms "comprising," "including," "having," and the like, as used with respect to embodiments of the present disclosure, are synonymous.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. The logic and functionality described herein may be implemented by any such components.

Although specific embodiments have been illustrated and described herein, it is noted that a wide variety of alternate and/or equivalent implementations may be substituted for the specific embodiment shown and described without departing from the scope of the present disclosure. The present disclosure covers all methods, apparatus, and articles of manufacture fairly falling within the scope of the appended claims either literally or under the doctrine of equivalents. This application is intended to cover any adaptations or variations of the embodiment disclosed herein. Therefore, it is manifested and intended that the present disclosure be limited only by the claims and the equivalents thereof.

What is claimed is:

1. A method of reducing electromagnetic emissions generated by an image scanner, the method comprising:
cyclically dithering a frequency of a clock signal of the image scanner by repeated dither cycles;
upon commencement of a scan pass of a page of a document, determining a phase of the dither cycle;
suspending the dithering for a duration that is based, at least in part, on the determined phase of the dither cycle; and
after the duration, commencing all subsequent scan passes of the page of the document at a particular phase shift from the determined phase of the dither cycle.

2. The method of claim 1, wherein the particular phase shift from the determined phase of the dither cycle corresponds to a zero frequency offset of the dither cycle.

3. The method of claim 1, wherein the scan pass of the page of the document that commences at the determined phase of the dither cycle is a first scan pass, and wherein the method further comprises:
repeating the first scan pass to commence at the particular phase shift from the determined phase of the dither cycle.

4. The method of claim 1, wherein:
the particular phase shift from the determined phase of the dither cycle corresponds to a particular frequency offset of the dither cycle,
each scan pass of the page of the document occurs over a time span that includes an integer number of complete dither cycles and a partial dither cycle, and
the partial dither cycle for each scanning pass of the page of the document ends at the particular frequency offset of the dither cycle.

5. The method of claim 4, further comprising:
maintaining the frequency of the clock signal of the image scanner at the particular frequency offset for a span of time between (i) an end of the partial dither cycle and (ii) a subsequent scan pass.

6. The method of claim 1, wherein commencing all subsequent scan passes of the page of the document at the particular phase shift from the determined phase of the dither cycle is performed without delaying the subsequent scan passes.

7. The method of claim 1, further comprising:
detecting a last scan pass of the page of the document;
upon commencement of a scan pass of a subsequent page of the document determining a second phase of the dither cycle; and
commencing all subsequent scan passes of the subsequent page of the document at a second particular phase shift from the determined second phase.

8. An optical scanner, comprising:
a clock to provide a clock signal; and
scan control logic to
cyclically dither the frequency of the clock signal by repeating dither cycles,
upon commencement of a scan pass of a page of a document, determine a phase of the dither cycle,
suspend the dither for a duration that is based, at least in part, on the determined phase of the dither cycle, and
commence all subsequent scan passes of the page of the document at a particular phase shift from the determined phase of the dither cycle.

9. The optical scanner of claim 8, wherein the particular phase shift from the determined phase of the dither cycle corresponds to a zero frequency offset of the dither cycle.

10. The optical scanner of claim 8, wherein the scan pass of the page of the document that commences at the determined phase of the dither cycle is a first scan pass, and wherein the scan control logic is further configured to repeat the first scan pass to commence at the particular phase shift from the determined phase of the dither cycle.

11. The optical scanner of claim 8, wherein:
the particular phase shift from the determined phase of the dither cycle corresponds to a particular frequency offset of the dither cycle,
each scan pass of the page of the document occurs over a time span that includes an integer number of complete dither cycles and a partial dither cycle, and
the partial dither cycle for each scanning pass of the page of the document ends at the particular frequency offset of the dither cycle.

12. The optical scanner of claim 11, wherein the scan control logic is further configured to maintain the frequency of the clock signal of the image scanner at the particular frequency offset for a span of time between (i) an end of the partial dither cycle and (ii) a subsequent scan pass.

13. The optical scanner of claim 8, wherein the scan control logic is further configured to commence all subsequent scan passes of the page of the document at the particular phase shift from the determined phase of the dither cycle without delaying the subsequent scan passes.

14. An apparatus, comprising:
a clock generator that generates a clock signal;
a scanning unit that is responsive to the clock signal to scan a document in repeated pixel scan passes; and
    scan control logic configured to:
        cyclically dither the frequency of the clock signal by repeating dither cycles;
        upon commencement of a scan pass of a page of a document, determine a phase of the dither cycle;
        suspend the dither for a duration that is based, at least in part, on the determined phase of the dither cycle; and
        commence all subsequent scan passes of the page of the document at a particular phase shift from the determined phase of the dither cycle.

15. The apparatus of claim 14, wherein the particular phase shift from the determined phase of the dither cycle corresponds to a zero frequency offset of the dither cycle.

16. The apparatus of claim 14, wherein the scan pass of the page of the document that commences at the determined phase of the dither cycle is a first scan pass, and wherein the scan control logic is further configured to repeat the first scan pass to commence at the particular phase shift from the determined phase of the dither cycle.

17. The apparatus of claim 14, wherein:
    the particular phase shift from the determined phase of the dither cycle corresponds to a particular frequency offset of the dither cycle,
    each scan pass of the page of the document occurs over a time span that includes an integer number of complete dither cycles and a partial dither cycle, and
    the partial dither cycle for each scanning pass of the page of the document ends at the particular frequency offset of the dither cycle.

18. The apparatus of claim 17, wherein the scan control logic is further configured to maintain the frequency of the clock signal of the image scanner at the particular frequency offset for a time span between an end of the partial dither cycle and a subsequent scan pass.

19. The apparatus of claim 17, wherein the partial dither cycle comprises a linear return from an end of the last complete dither cycle to the particular phase shift from the determined phase of the dither cycle.

20. The apparatus of claim 14, wherein the scan control logic is further configured to commence all subsequent scan passes of the page of the document at the particular phase shift from the determined phase of the dither cycle without delaying the subsequent scan passes.

21. The apparatus of claim 14, wherein the scan control logic is further configured to commence all subsequent scan passes of the page of the document at the particular phase shift from the determined phase of the dither cycle without delaying the subsequent scan passes.

* * * * *